United States Patent [19]
Yukitomo

[11] Patent Number: 4,963,856
[45] Date of Patent: Oct. 16, 1990

[54] THEFT DETERRENT SYSTEM

[75] Inventor: Kazuo Yukitomo, Fukuyama, Japan

[73] Assignee: Mazda Motor Corporation, Hiroshima, Japan

[21] Appl. No.: 412,330

[22] Filed: Sep. 22, 1989

Related U.S. Application Data

[63] Continuation of Ser. No. 176,478, Apr. 1, 1988, abandoned.

[30] Foreign Application Priority Data

Apr. 3, 1987 [JP] Japan .................. 62-83424
Apr. 27, 1987 [JP] Japan .................. 62-105882

[51] Int. Cl.$^5$ .................................. B60R 25/10
[52] U.S. Cl. .................... 340/426; 180/287
[58] Field of Search ......... 340/426, 430; 307/10.2; 180/287

[56] References Cited

U.S. PATENT DOCUMENTS

| | | | |
|---|---|---|---|
| 3,281,785 | 10/1966 | Oursler | 340/63 |
| 3,513,466 | 5/1970 | Isaacs et al. | 340/63 |
| 3,858,175 | 12/1974 | Kopera, Jr. | 340/63 |
| 4,337,454 | 6/1982 | Iwata | 340/63 |
| 4,574,268 | 3/1986 | Ohnishi | 340/64 |
| 4,754,255 | 6/1988 | Sanders et al. | 340/64 |

FOREIGN PATENT DOCUMENTS

| | | | |
|---|---|---|---|
| 3003887 | 8/1981 | Fed. Rep. of Germany | 340/63 |
| 60-50052 | 3/1985 | Japan | |

OTHER PUBLICATIONS

"Z-LOK Auto Security Systems", Jan. 11, 1988.

Primary Examiner—Joseph A. Orsino
Assistant Examiner—Brian R. Tumm
Attorney, Agent, or Firm—Lynn L. Augspurger

[57] ABSTRACT

A system for deterring theft of a vehicle having a plurality of opening and closing parts (doors, hood, trunk lid, etc.) divided into a first group of opening and closing parts (singular or plural) and a second group of opening and closing parts (singular or plural) includes an alarm device for outputting an alarm exteriorly of the vehicle, an open/closed state sensor for sensing individual open and closed states of each of the plurality of opening and closing parts and outputting signals indicative of the states sensed, a device for sensing that an ignition signal for starting the vehicle engine has been generated, a first setting device for setting the vehicle to a first armed phase in response to driver operation, a first actuating device for actuating the alarm in the first armed phase in response to at least one signal from among the ignition signal and signals indicative of the open states of the plurality of opening and closing parts, a second setting device for setting the vehicle from the first armed phase to a second armed phase in response to driver operation, and a second actuating device for actuating the alarm in the second armed phase in response to at least one signal from among the ignition signal and signals indicative of the open states of the plurality of opening and closing parts belonging solely to the second group. Thus, theft is deterred not only in the first armed phase but also in the second armed phase.

19 Claims, 17 Drawing Sheets

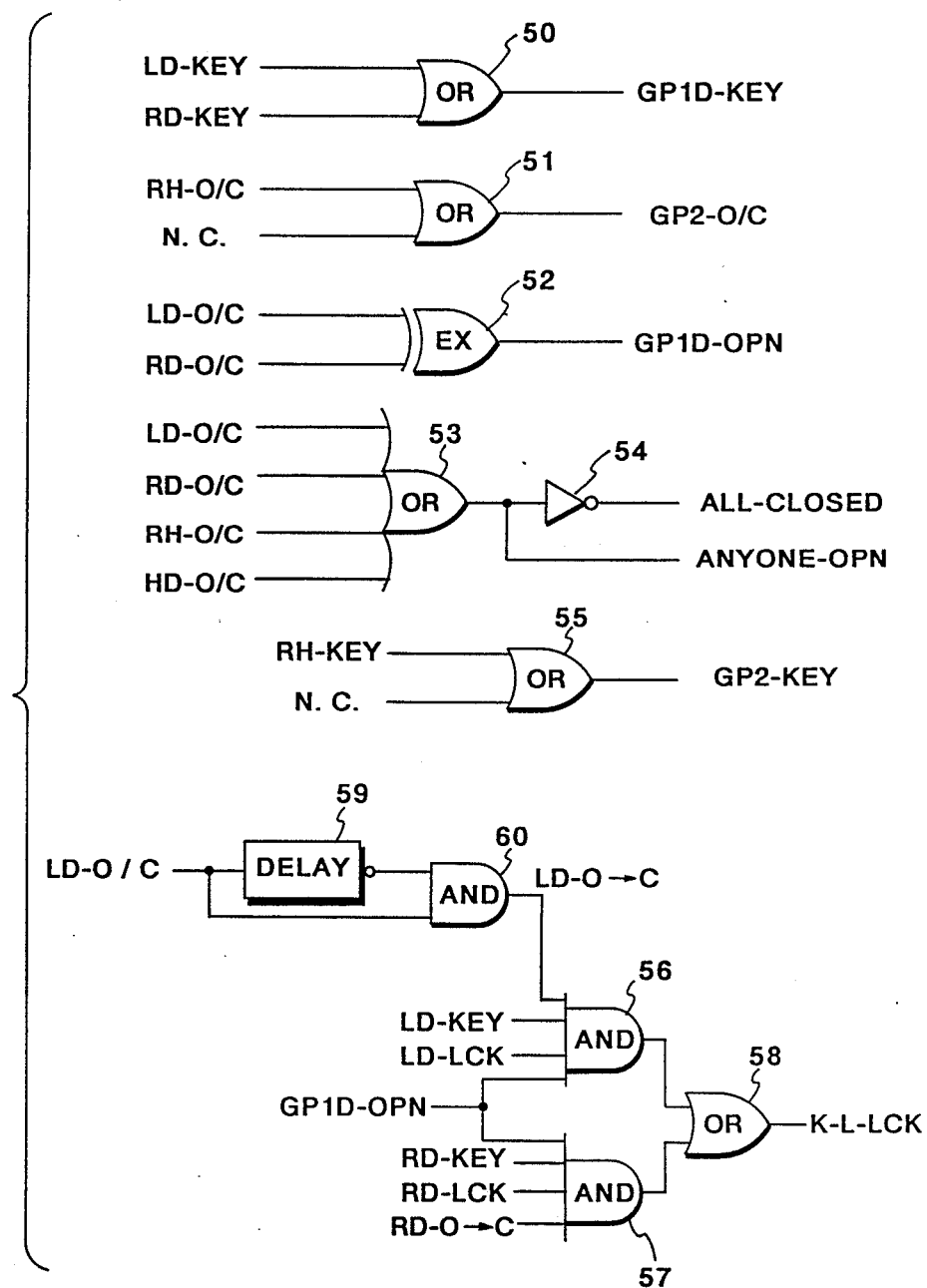
F I G. 4 A

| PREVAILING PHASE | OUTPUT | | | | | TRANSITION TO | TRANSITION CONDITION |
|---|---|---|---|---|---|---|---|
| | HORN | CUT-OFF SWITCH | FLASHERS | BUZZER | SECURITY LAMP | | |
| DEAD | — | — | — | — | — | INITIAL ① | IG-KEY* *EG-KEY* |
| INITIAL | — | — | — | — | — | DEAD ② | IG-KEY +EG-KEY |
| | | | | | | FIRST ARMING ③ | ALL-CLOSED |
| FIRST ARMING | — | — | — | ACTUATED | — | INITIAL ④ | GP1D-ULK-OPN *(IG-KEY+EG-KEY) |
| | | | | | | SECOND ARMING ⑤ | K-L-LCK |
| SECOND ARMING | — | — | — | ACTUATED | LIT | INITIAL ⑥ | ANYONE-KEY + ANYONE-OPN |
| | | | | | EXTINGUISHED | FIRST ARMED ⑦ | TIME T1 ELAPSED |

| Current State | | | | | Next State | Condition |
|---|---|---|---|---|---|---|
| FIRST ARMED | — | — | — | — | INITIAL ⑧ | GP1D-KEY + IG-ON |
| | | | | EXTINGUISHED | SECOND ARMED ⑨ | RH-KEY |
| | | | | | FIRST ALARM ⑩ | TRIGGER INPUT |
| SECOND ARMED | — | — | — | — | INITIAL ⑪ | GP1D-KEY + IG-ON |
| | | | | EXTINGUISHED | FIRST ARMED ⑫ | RH-O/C |
| | | | | | FIRST ALARM ⑬ | TRIGGER INPUT (EXCLUDING REAR HATCH DOOR) |
| FIRST ALARM | ACT-UATED | ACTUATED | — | — | INITIAL ⑭ | GP1D-KEY + GP2-O/C * GP2-KEY |
| | | | | EXTINGUISHED | SECOND ALARM ⑮ | TIME T2 ELAPSED |
| SECOND ALARM | — | ACTUATED | — | — | INITIAL ⑯ | GP1D-KEY + GP2-O/C * GP2-KEY |
| | | | | EXTINGUISHED | FIRST ALARM ⑰ | TRIGGER INPUT AGAIN |

| PHASE | CONTINUATION TIME | EG-KEY | IG-KEY | LD-O/C | RD-O/C | RH-O/C | HD-O/C | LD-LCK | RD-LCK | LD-KEY | RD-KEY | RH-KEY |
|---|---|---|---|---|---|---|---|---|---|---|---|---|
| DEAD | — | EITHER ONE ON ||  — | — | — | — | — | — | — | — | — |
| INITIAL | — | o | o | — | — | — | — | — | — | — | — | — |
| FIRST ARMING | — | o | o | CLOSED | CLOSED | CLOSED | CLOSED | — | — | — | — | — |
| SECOND ARMING | T1 | o | o | AT LEAST ONE OPEN ||||  o | o | o | o | o |
| FIRST ARMED | — | o | o | CLOSED | CLOSED | CLOSED | CLOSED | o | o | o | o | o |
| SECOND ARMED | — | o | o | CLOSED | CLOSED | CLOSED | CLOSED | o | o | o | o | o |
| FIRST ALARM | T2 | — | — | AT LEAST ONE ON OR OPEN |||| — | — | o | o | o |
| SECOND ALARM | — | — | — | |||| — | — | o | o | o |

SUSTAINING CONDITIONS

FIG. 6C

THEFT DETERRENT SYSTEM

This is a continuation of co-pending application Ser. No. 176,478, filed Apr. 1, 1988, now abandoned.

BACKGROUND OF THE INVENTION

1. Field of the Invention:

This invention relates to a vehicle theft deterrent system for protecting the articles in an automotive vehicle, or the automotive vehicle itself, against theft.

2. Description of the Prior Art:

A traditional method of deterring the theft of a vehicle such as an automotive vehicle according to the prior art involves locking the doors, trunk lid and other opening and closing parts of the vehicle by means of a key. However, when the driver and passengers leave the car, a thief may break a window glass and pilfer articles from within the vehicle even though the opening and closing parts have been locked, or the thief may unlock the vehicle by destroying a lock or breaking a window glass, open a door and then use a tool or the like to operate the ignition switch, start the engine and steal the vehicle itself. Thus, the traditional theft deterrent method merely locks the vehicle and does not really deter theft in positive fashion.

Electronic theft deterrent systems that achieve more than the traditional locking method have appeared in recent years. In a typical example of such an electronic theft deterrent system, an "armed phase" is established by closing and locking each opening and closing part of the vehicle, closing the last door and then locking this door without use of a key (so-called "keyless locking", an example of which is locking using a lock button). If someone unlocks or opens any of the opening and closing parts without a key or turns on the ignition switch in the armed phase, an alarm is issued and/or the vehicle is placed in a state in which it cannot travel. Thus, the electronic system does not merely rely upon simple locking but is operatively associated with an alarm to achieve postive theft deterrence. However, if the armed phase is established but then a back door or the like is opened by using a key so that a passenger can retrieve an article from within the vehicle, the armed phase is cancelled and remains cancelled even after the back door is closed. In other words, it is necessary to repeat the keyless locking operation described above.

Japanese Patent Application Laid-Open (KOKAI) No. 60-50052 discloses a theft deterrent system designed to eliminate this inconvenience. Specifically, after the vehicle is placed in the armed phase as by the keyless locking operation, the armed phase is temporarily cancelled for all opening and closing parts of the vehicle if, say, the back door is opened, but the armed phase is restored when the back door closed again.

However, in this proposed system of Japanese Patent Application Laid-Open No. 60-50052 in which the armed phase is cancelled by opening the back door or the like, though it is true that the armed phase is restored when the back door is closed, the vehicle is left defenseless while the back door is open. For example, in order to carry articles from the interior of the vehicle to another place, the driver must leave the vehicle while the back door, say, is left open. There is always the danger that a thief may enter the vehicle while the driver is absent and either pilfer articles from within the vehicle or start the engine and steal the vehicle itself.

Another problem with this prior-art electronic theft deterrent system is that since the armed phase generally is cancelled by use of a key, there is the danger that a thief may forcibly extract a key cylinder from one of the doors to establish a condition similar to that produced by unlocking the door by key, despite the fact that the armed phase has been set. When a door such as a back door is opened under such conditions, the armed phase is cancelled and the vehicle is therefore left unguarded.

SUMMARY OF THE INVENTION

Accordingly, an object of the present invention is to provide a theft deterrent system in which the armed phase for preventing theft is established not only when all opening and closing parts of the vehicle are closed but also when a certain opening and closing part is open.

According to the present invention, the foregoing object is attained by providing a theft deterrent system comprising: a vehicle having a plurality of opening and closing parts attached thereto, the plurality of opening and closing parts being divided into a first group of opening and closing parts (one or a plurality) and a second group of opening and closing parts (one or a plurality); alarm means for outputting an alarm exteriorly of the vehicle; open/closed state sensing means for sensing individual open and closed states of each of the plurality of opening and closing parts and outputting signals indicative of the states sensed; means for sensing that an ignition signal for starting an engine of the vehicle has been generated; first setting means for setting the vehicle to a first armed phase in response to an operation performed by the driver; first actuating means for actuating the alarm means in the first armed phase in response to at least one signal from among the ignition signal and signals indicative of the open states of the plurality of opening and closing parts; second setting means for setting the vehicle from the first armed phase to a second armed phase in response to an operation performed by the driver; and second actuating means for actuating the alarm means in the second armed phase in response to at least one signal from among the ignition signal and signals indicative of the open states of the plurality of opening and closing parts belonging solely to the second group.

Thus, in accordance with the theft deterrent system constructed as set forth above, the alarm is actuated in the first armed phase if any one of the plurality of opening and closing parts is opened or, in response to the ignition signal, if someone attempts to start the engine without opening an opening and closing part, such as by entering the vehicle through a window. In other words, all possible forms of theft are deterred in the first armed phase. If the second setting means sets the vehicle from the first armed phase to the second armed phase in response to an operation performed by the driver, or in other words, if a transition is made to the second armed state as by inserting a key for the purpose of opening a back door hatch or in response to a signal from a remote transmitter, the alarm will not be actuated even if one or more of the opening and closing parts (e.g. the back door hatch) in the second group of opening and closing parts is opened in the second armed phase. Accordingly, the driver is allowed to load or unload articles through any opening and closing part belonging to the second group without actuating the alarm. Meanwhile, the alarm means will react in response to a signal indicating that any of the other opening and closing parts is open and in response to the ignition signal as well. Therefore, if a thief attempts to open one of the other opening and closing parts or to start the engine upon entering the vehicle through an open opening and closing part belonging to the second group, the alarm will be actuated.

In an embodiment of the invention, the first setting means and (or) the second setting means each include driver operation detecting means for outputting an operation signal or command signal upon detecting an operation performed by the driver or a command from the driver for placing the vehicle in the armed phase, the vehicle being placed in the first armed phase and (or) the second armed phase based on the operation signal or command signal. The operation performed by the driver refers, for example, to a case where the driver operates the lock buttons on the opening and closing parts in the first group without using a key. The command from the driver refers, for example, to a command signal from a remote transmitter operated by the driver.

In an embodiment of the invention, each opening and closing part in the first group includes lock operating means for locking the opening and closing part by being manipulated by the driver. The driver operation detecting means includes means for each of the plurality of opening and closing parts for outputting a key signal upon detecting, for each opening and closing part, that a key for opening the opening and closing part has been used, means for outputting a lock operation signal upon detecting operation of the lock operating means, and logic means for detecting, simultaneously, that the key signal regarding any one of the opening and closing parts in the first group is false, that the lock operation signal is true and that a signal indicating the open state of an opening and closing part for which the key signal represents non-use of the key is true. Thus, the setting of the first armed phase is accomplished by a so-called keyless locking operation.

In an embodiment of the invention, the setting of the vehicle to the second armed phase by the second setting means is performed if it is detected that a key is used in order to open at least one opening and closing part in the second group. Thus, the second armed phase is established even if an opening and closing part in the second group is opened. Effecting the transition to the second armed phase by using a key in the opening and closing part of the second group contributes to improved operability.

According to an embodiment of the invention, one opening and closing part in the first group is a side door of the vehicle, and the side door is that on the side of the driver's seat or on the side of the assistant driver's seat. The opening and closing parts in the first group are exempted from disarming in the second armed phase. Including the door on the side of the driver's seat or the door on the side of the assistant driver's seat in the first group enhances the theft deterrent effect in view of the fact that these doors are close to the ignition key.

According to an embodiment of the invention, one of the opening and closing parts in the second group is a back door, rear hatch door, trunk lid or engine hood of the vehicle. The reason for this is that the abovementioned doors, trunk lid and engine hood are used to load or unload articles or to service the engine, and a driver becoming too engaged in any of these activities is likely to be less vigilant against theft. Also, the fact that the back doors lead to the driver's seat can directly result in theft of the vehicle.

According to an embodiment of the invention, the system further comprises engine starter means for electrically starting rotation of the engine, means for supplying the starter means with electric power, and power cut-off means for cutting off the supply of electric power, and the first and second actuating means include means for activating the power cut-off means. In this way the supply of electric power to the engine starter can be cut off to improve theft deterrence.

According to an embodiment of the invention, the system further includes timer means for monitoring elapsed time and outputting a time-up signal when a set period of time has elapsed. By employing the timer means to place a fixed limit upon the time during which the alarm is issued by the alarm means, the vehicle battery can be prevented from becoming depleted.

According to an embodiment of the invention, the system further comprises engine starter means for electrically starting rotation of the engine, means for supplying the starter means with electric power, power cut-off means for cutting off the supply of electric power, and means for outputting a key signal upon detecting, with regard to each opening and closing part, that a key has been used to open the opening and closing part. The first and second actuating means include means for activating the power cut-off means, and means for deactivating the power cut-off means upon detecting that a key signal regarding an opening and closing part in the first group is true. Thus, though the time during which the alarm is issued by the alarm means is limited to a fixed period, the cut-off of power to the engine starter is not cancelled so long as the key for the opening and closing parts of the first group is not used. This makes it possible to prevent depletion of the battery and to enhance theft deterrence at the same time.

According to an embodiment of the invention, the system further comprises sensor means provided in a passenger compartment of the vehicle for outputting a moving-object signal upon sensing movement of an object within the passenger compartment. The first actuating means actuates the alarm means in the first armed phase in response to at least one signal from among the ignition signal, the signals indicating the open states of the plurality of opening and closing parts and the moving-object signal. The second actuating means actuates the alarm means in the second armed phase in response to at least one signal from among the ignition signal, the signals indicating the open states of the opening and closing objects solely in the second group, and the moving-object signal. This further enhances theft deterrence.

According to an embodiment of the invention, the sensor means renders the second actuating means non-responsive to the moving-object signal in the second armed phase. Thus, erroneous operation due to the driver's loading or unloading articles in the second armed phase is prevented.

In an embodiment of the invention, the sensor means includes an ultrasonic oscillating body and a receiving body.

In an embodiment of the invention, the setting of the first and second armed phases is performed by a receiver responsive to a sound wave or light signal produced by a remote transmitter possessed by the driver, the signal being received by the receiver upon passing through a glass window.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings illustrate an embodiment of the present invention, in which:

FIGS. 4A and 4B are circuit diagrams illustrating logic circuits in the controller of FIG. 3;

FIGS. 6A through 6C are views illustrating the transition from one phase to another in the theft deterrent system;

DESCRIPTION OF THE PREFERRED EMBODIMENT

An embodiment of the present invention will now be described.

Figure 1:
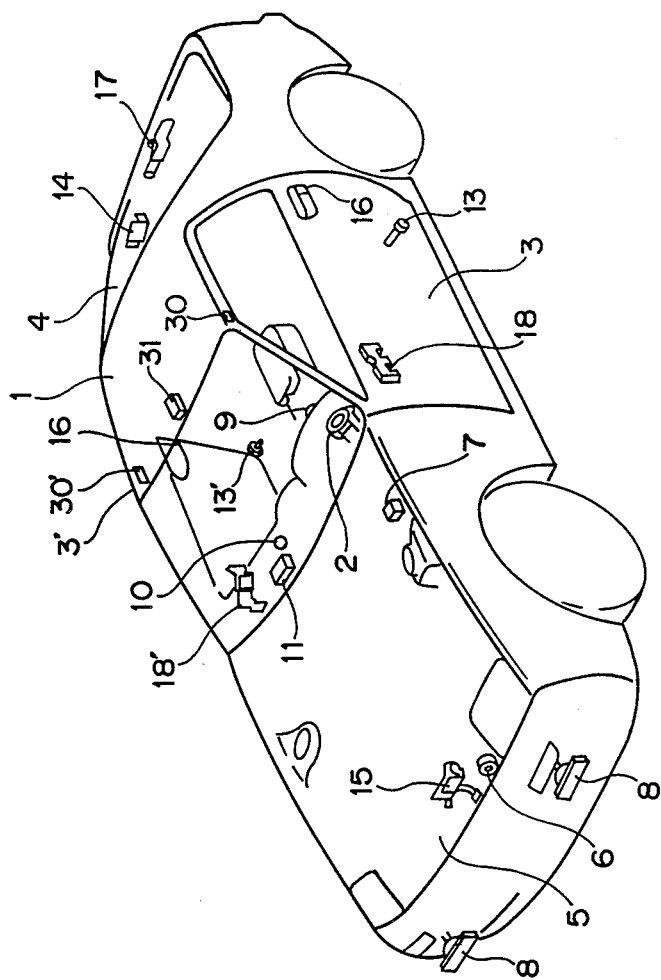
FIG. 1 is a perspective view illustrating the arrangement of the elements of a theft deterrent system in an embodiment in which the invention is applied to two-door automobile having a rear hatch door.

A passenger car 1 shown in FIG. 1 is of the so-called "hatchback" type and has two doors, namely left and right side doors 3, 3'. These side doors 3, 3', a rear hatch door 4 and an engine hood 5 are opening and closing parts of the vehicle.

Figure 2A:
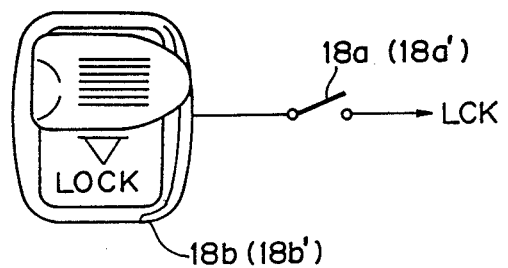
FIG. 2A is a perspective view of a lock button used in a keyless lock.

The left and right side doors 3, 3' are provided with respective key cylinders 16, 16' into which a key for opening and closing the door is inserted, and respective lock mechanisms 18, 18' operatively associated with corresponding lock buttons (the configuration of which is shown in FIG. 2A) to lock the doors. The vehicle body is provided with switches 13, 13' for sensing whether the corresponding doors are open or closed. The key cylinders 16, 16' have respective key switches 16a, 16a' (FIG. 3) for sensing insertion of the key. The engine hood 5 is provided with a latch mechanism 15 for latching the hood in the closed state, the latch mechanism having a switch 15a (FIG. 3) for detecting whether the hood 5 is open or closed. The rear hatch door 4 is provided with a key cylinder 17 in which a key for opening and closing this door is inserted, a key switch 17a for detecting insertion of the key into the key cyclinder 17, and a switch 14 for detecting whether this door is open or closed.

Thus, the automobile 1 of this embodiment has four opening and closing parts. According to the general concept of the invention, the opening and closing parts of a vehicle such as an automobile are divided into a first group consisting of those opening and closing parts that are to be monitored by the theft deterrent system at all times, and a second group consisting of those opening and closing parts that should be exempted from this monitoring in certain cases. Then, in the automobile 1 of the embodiment shown in FIG. 1, if the rear hatch door 4 is to be exempted from monitoring when articles are loaded and unloaded through this door, the side doors 3, 3' and engine hood 5 are assigned to the first group to be monitored at all times, and the rear hatch door 4 is assigned to the second group. This can be viewed from a different standpoint. For example, if the engine hood 5 is opened during servicing of the engine, the side doors 3, 3' and the rear hatch door 4 are assigned to the first group, and the engine hood 5 is assigned to the second group. In the embodiment described hereinafter, the former arrangement will hold. That is, the invention will be described based on an embodiment in which the side doors 3, 3' and engine hood 5 are assigned to the first group and the rear hatch door 4 is assigned to the second group.

An ignition switch assembly 2 is provided with a key cylinder (not shown) in which an engine key is inserted. The switch assembly 2 has positions such as "OFF, "ACC", "IG" and "START".

The automobile 1 has a horn 6 and flasher lights 8 that can serve as alarm means. If a thief is attempting to penetrate the vehicle or has succeeded in doing so, the horn 6 sounds an alarm warning and the flasher lights 8 flash intermittently. Also, though not alarm means in the strict sense of the word, the interior of the vehicle is provided with a security lamp 9 which, by purposely indicating to one outside that the automobile 1 is in a guarded state, can prevent theft before it occurs by intimidating a would-be intruder. Additional alarm means for preventing theft of the automobile itself is a cut-off switch 7 adapted to cut off the engine starter, thereby rendering the vehicle immobile, when an alarm is actuated.

When the automobile is in an "armed" phase, namely a condition in which an alarm can be issued, attempting to open a door without a key, for example, serves as a trigger for issuing the alarm. Other examples of triggers for issuing an alarm include generation of an ignition signal without use of a key, detection of a moving object within the automobile, etc. To detect the former, a signal (EG-KEY) from an engine key switch 2b of ignition switch assembly 2 (FIG. 1) and a signal (IG-KEY) from an ignition switch 2a of the ignition switch assembly 2 are monitored. To detect the latter, it is so arranged that ultrasonic waves from ultrasonic transmitters 30, 30' provided on the vehicle body above the left and right side doors, respectively, are received by a receiver 31 provided at the position of an overhead console. If a moving object is inside the automobile, this will be detected by a change in the intensity of the ultrasonic waves received by the receiver 31.

Figure 3:
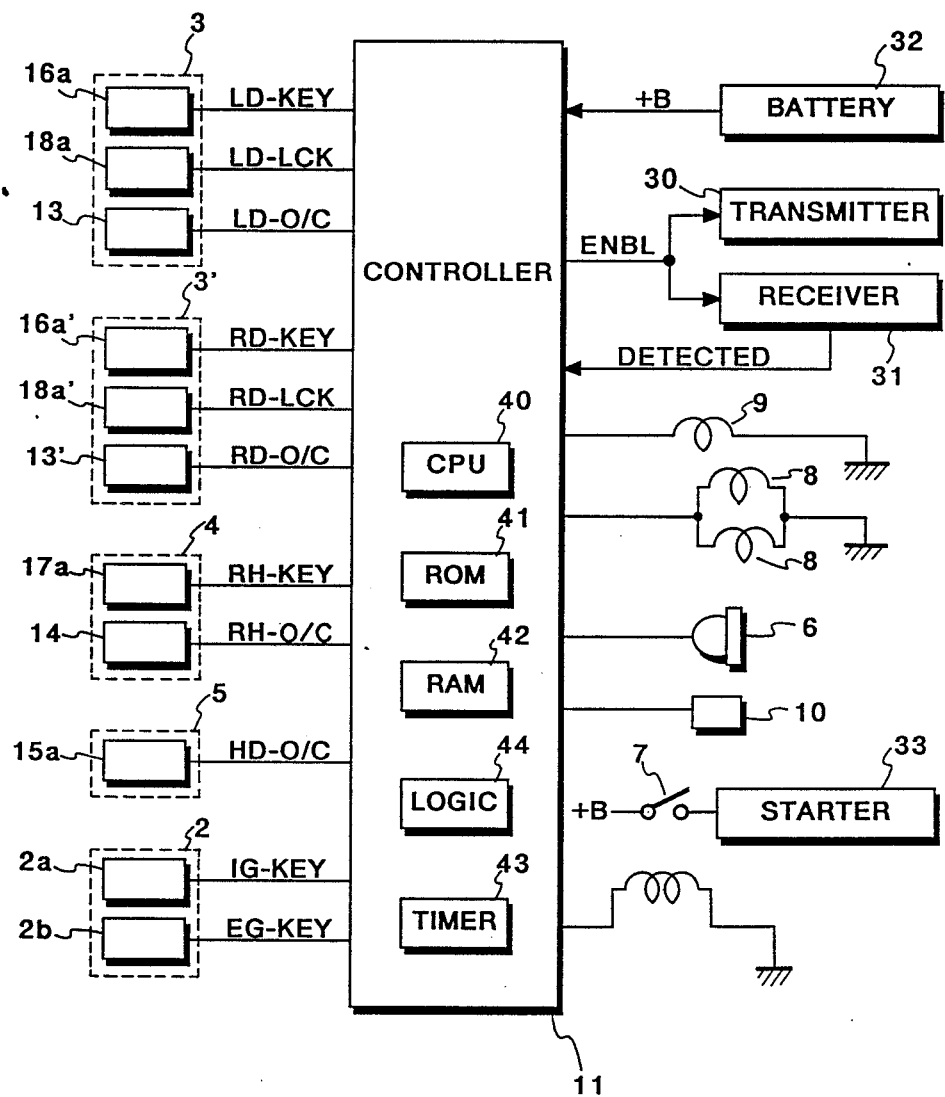
FIG. 3 is a view illustrating the arrangement of a controller for the theft deterrent system of the embodiment.

In FIG. 1, numeral 11 denotes a control unit for controlling the setting of the aforementioned armed phase, the detection of vehicle penetration, the issuance of alarms, etc. The detailed construction of this control unit is shown in FIG. 3.

Figure 2B:
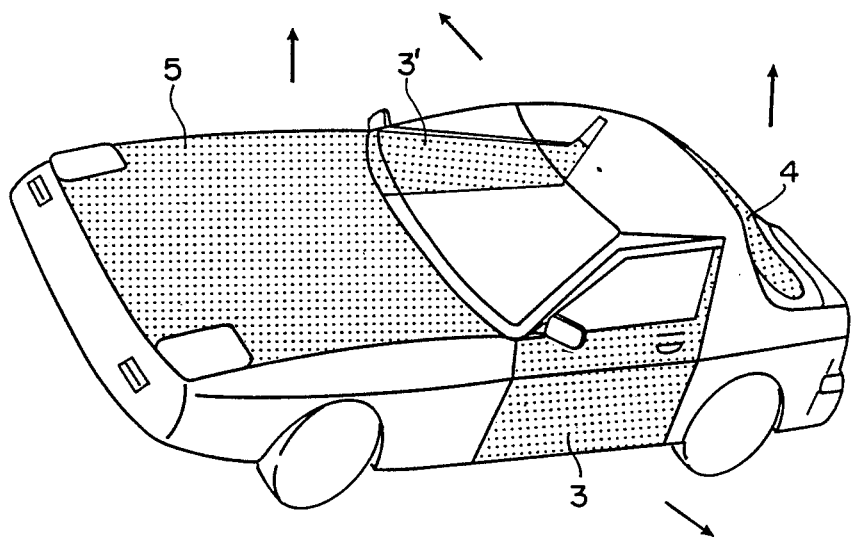
FIGS. 2B and 2C are views for describing parts of the automobile that are guarded in first and second armed phases.
Figure 2C:
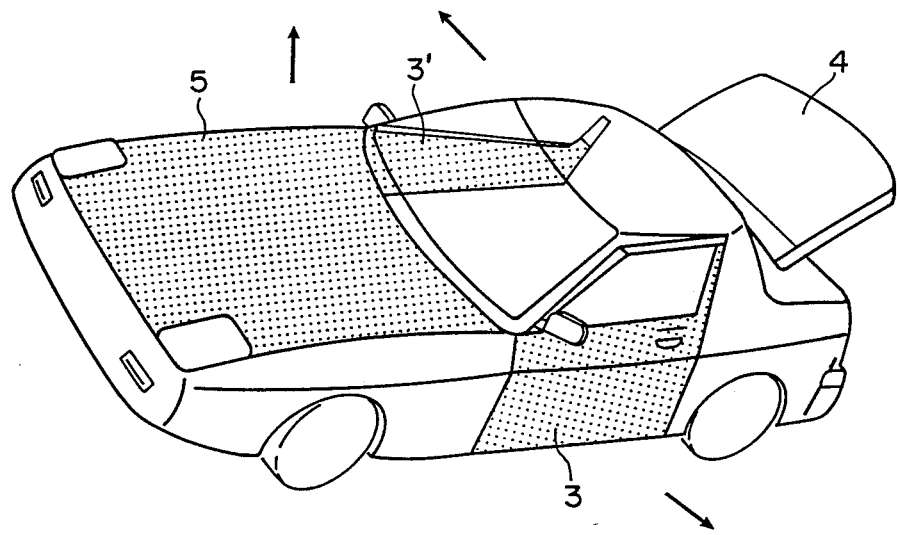

FIGS. 2A through 2C illustrate operation of the theft deterrent system installed in an automobile. FIG. 2A is a front view of a lock button 18b (18b') provided in the lock mechanism 18 (18'). In general, this button is mainly used to lock the door so that the door cannot be opened by inadvertent operation of a door lever the purpose of which is to open the door from the inside. The lock button 18b (18b') is mechanically associated with a lock link switch 18a (18a'). A typical example of a basic operation for placing the automobile of the present embodiment in an armed phase will now be described.

Specifically, when the driver wishes to place the vehicle in the armed phase upon leaving the vehicle by opening the side door 3 in a state where the other doors, hood and rear hatch are closed, the driver first removes the engine key upon placing the switch assembly 2 in the "LOCK" position. The driver then opens the side door 3 on the drivers' side, exits from the vehicle and places the lock button on the side door 3 in the "LOCK" position. Next, the driver closes the door 3 without inserting the key in the key cylinder 16 of the side door 3. This is so-called "keyless locking". This keyless locking operation is the step that finally places the vehicle in the armed phase.

Establishing the armed phase by keyless locking is well-known in the art and is not a characterizing feature of the invention. One characterizing feature of the present embodiment is that first and second armed phases are set, the first armed phase being established by keyless locking, with a transition being made from the first armed phase to the second armed phase by opening the rear hatch door 4, which is the opening and closing part belonging to the second group. The first armed phase is one in which an alarm is actuated if any of the opening and closing parts (3, 3', 4, 5) is opened without using the key, or a moving object is detected inside the automobile, or engine start is attempted, as shown in FIG. 2B. The second armed phase is one in which an alarm is actuated if an opening and closing part other than the rear hatch door is opened without using the key, or engine start is attempted without using the key, as shown in FIG. 2C. If, in the second armed phase, the rear hatch door 4 is opened without using the key, or a moving object is sensed inside the vehicle, an alarm is not issued, unlike the first armed phase. Thus, even if the rear hatch door 4 is opened, the other components of the theft deterrent system remain in effect. This allows the driver to devote himself to loading and unloading the vehicle without worrying about theft.

FIG. 3 illustrates the connections between the control unit 11, which controls the theft deterrent system, and the other components of the system. The key switch 16a of the side door 3 (left side door) outputs a signal LD-KEY indicating that a key has been inserted into the left door. The lock link switch 18a outputs a signal LD-LCK indicating that the lock button on the left door has been depressed. The switch 13 outputs a signal LD-O/C indicating the state of the left door 3 ("1" indicating that the left door is open, "0" indicating the left door is closed). Similarly, switches 16a',18a' and 13' of the right door outputs signals RD-KEY, RD-LCK, RD-O/C. The switches 17a, 14 of the rear hatch door 4, which is the opening and closing part belonging to the second group, output respective signals RH-KEY, RH-O/C. The switch 15a of the engine hood 5 outputs a signal HD-0, and the ignition switches 2a, 2b output signals IG-KEY, EG-KEY, respectively. These various signals enter the control unit 11 and are processed by a CPU 40 within the control unit. The control unit 11 is supplied with power from a battery 32 at all times.

When the system is placed in the first guarded phase, the controller 11 activates the ultrasonic transmitter 30 and receiver 31 by a signal ENBL. A signal DETECTED produced by the receiver 31 in response to detection of a moving object is inputted to the controller 11.

Indications or outputs related to alarms actuated by the controller 11 are made by the security display lamp 9, flasher lights 8, horn 6 and a buzzer 10. Further, in order to made it impossible to start the engine when an alarm is actuated, the controller 11 sends a signal CUT to a solenoid in a cut-off switch 7. When the solenoid is energized, normally closed contacts are opened to cut off the supply of power to a stator of a cell motor or the like.

Included in the controller 11 are a CPU 40 for controlling the overall operation of the controller 11, a ROM 41 storing programs shown in FIGS. 9A through 9D, a RAM 42 for storing intermediate information, etc., that appears in the control process, and a timer 43 programmable by the CPU 40. The timer 43 is used to monitor time and has two channels so as to be capable of independently monitoring time periods T1 and T2, as will be described below. The controller 11 also includes a logic circuit 44.

Figure 4B:
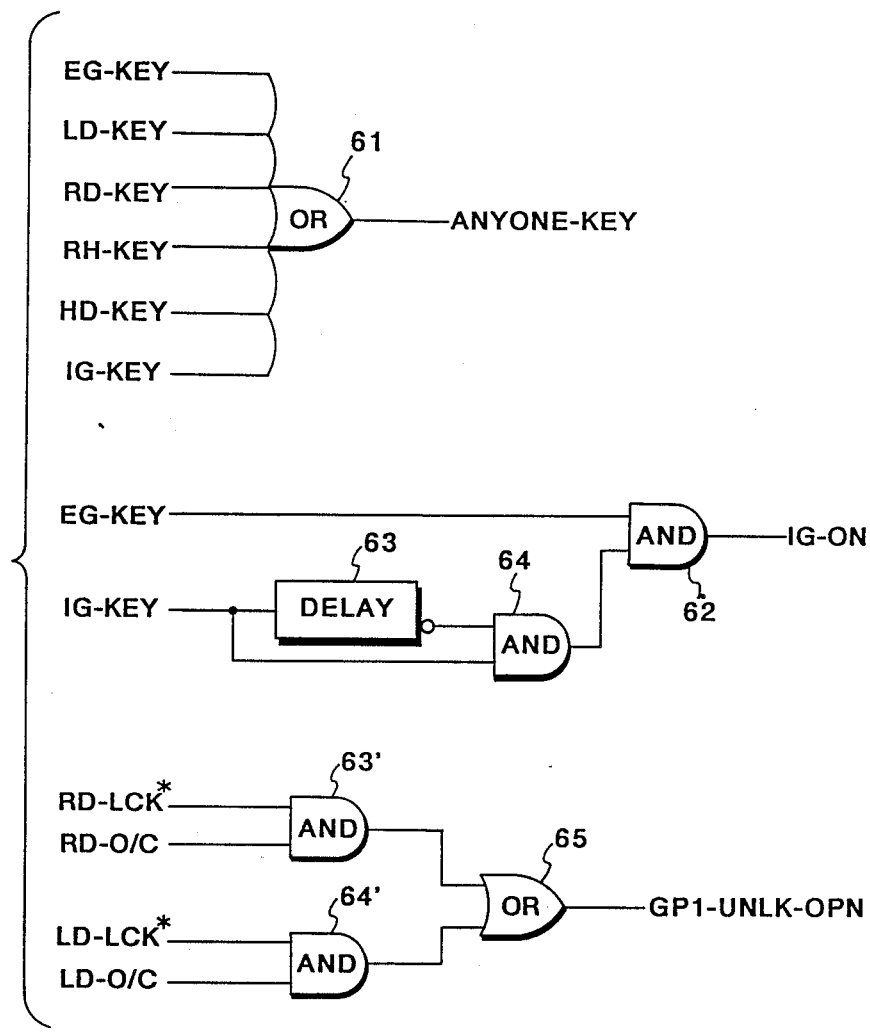

FIG. 4 illustrates the logic circuit 44, which is for converting the signals that enter the controller 11 in such a manner that the CPU 40 may control theft deterrent with facility. Each of the signals shown in FIG. 4 is inputted to and latched in a latching-type input port (not shown) of the CPU 40. Thus, the CPU 40 may read a latched signal via the port to ascertain the status of the automobile.

The signals shown in FIG. 4 will now be described. When either of the signals LD-KEY and RD-KEY becomes logical "1", a signal GP1D-KEY is produced by an OR gate 50. The signal GP1D-KEY indicates that a key has been inserted into at least one door among the opening and closing parts belonging to the first group. In response to input of the signal RH-O/C (="1") at one input terminal thereof, an OR gate 51 produces a signal GP2-O/C indicating that the rear hatch door 4, which is the opening and closing part belonging to the second group, has been opened. The other input terminal of OR gate 51 is used when another door or the hood 5 is set as an opening and closing part belonging to the second group.

An exclusive-OR gate 52 produces a signal GP1D-OPN indicating that only one of the left and right side doors belonging to the first group has been opened.

If any one of the opening and closing parts is open, an OR gate 53 outputs a signal ANYONE-OPN. An output ("1") from an inverter 54 is a signal ALL-CLOSED. An OR gate 61 outputs a signal ANYONE-KEY if a key is inserted into the key cylinder of a side door or into the ignition assembly 2.

An OR gate 55 outputs a signal GP2-KEY if the key is inserted into the key cylinder of the rear hatch door 4 belonging to the second group. If the second group includes another an opening and closing part besides the rear hatch door, the corresponding key signal is applied to the other input terminals of the OR gate 55.

A delay circuit 59 and an AND gate 60 cooperate to produce a signal LD-O-->C, which indicates that the left door 3 is taken from the open state and placed in the closed state. A signal RD-O-->C is similarly produced with regard to the right door 3'. These signals LD-O-->C, RD-O-->C are employed by gates 56–58 to produce a keyless lock signal K-L-LK. With regard to the left door, the keyless lock signal is produced when the lock button is pressed to place the door in the locked state from the open state without inserting a key. Specifically, the keyless lock signal K-L-LK is produced through the following operation:

$$K\text{-}L\text{-}LK = LD\text{-}KEY \cdot LD\text{-}LCK$$
$$\cdot GP1D\text{-}OPN \cdot LD\text{-}O \longrightarrow C$$
$$+ RD\text{-}KEY \cdot RD\text{-}LCK$$
$$\cdot GP1D\text{-}OPN \cdot RD\text{-}O \longrightarrow C$$

When at least one of a door key and engine key is inserted into a prescribed cylinder, the OR gate 61 outputs the signal ANYONE-KEY.

If the engine key is at the position "OFF" or "ACC" in the ignition assembly 2 and the key is then turned to the "IG" position, the status of the signal IG-KEY changes from "0" to "1". This change is detected by a combination of a delay circuit 63 and gate 64, and an AND gate 62 outputs a signal IG-ON.

An output signal GP1D-UNLK-OPN from an OR gate 65 indicates that either the left or right door has been unlocked by turning off (i.e. pulling up) the lock button on the corresponding door.

Figure 5A:
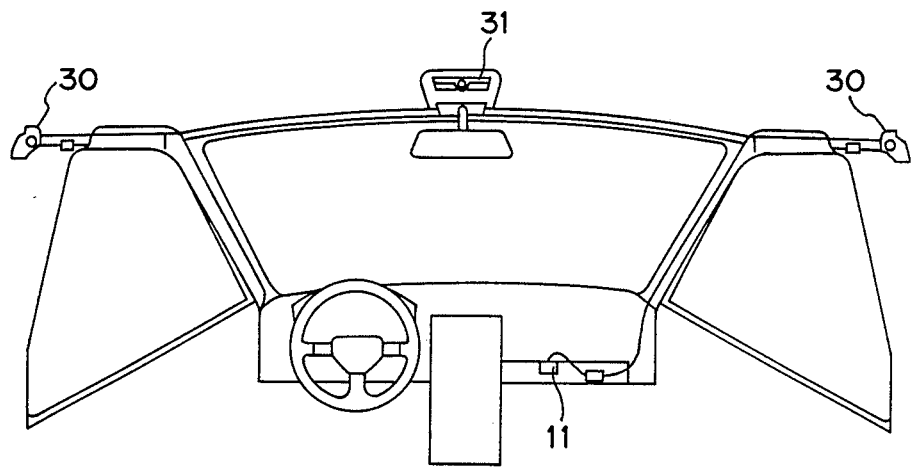
FIGS. 5A through 5C are views illustrating the mounting positions of ultrasonic sensors for sensing a moving object, as well as the structure of these sensors.
Figure 5B:
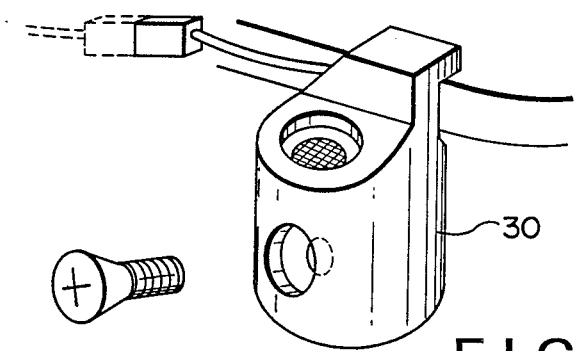
Figure 5C:
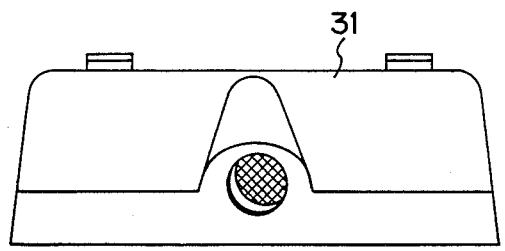

FIGS. 5A through 5C illustrate the moving object detection system. FIG. 5A shows locations at which the receivers (numbered 30) and transmitter 31 are installed. These devices can be installed with ease as optional equipment. FIG. 5B is a perspective view of the transmitter 30, and FIG. 5C is a front view of the transmitter 31. Ultrasonic waves are emitted from the hatched portion of the transmitter 31 and are received by the hatched portion of the receiver 30.

Figure 6A:
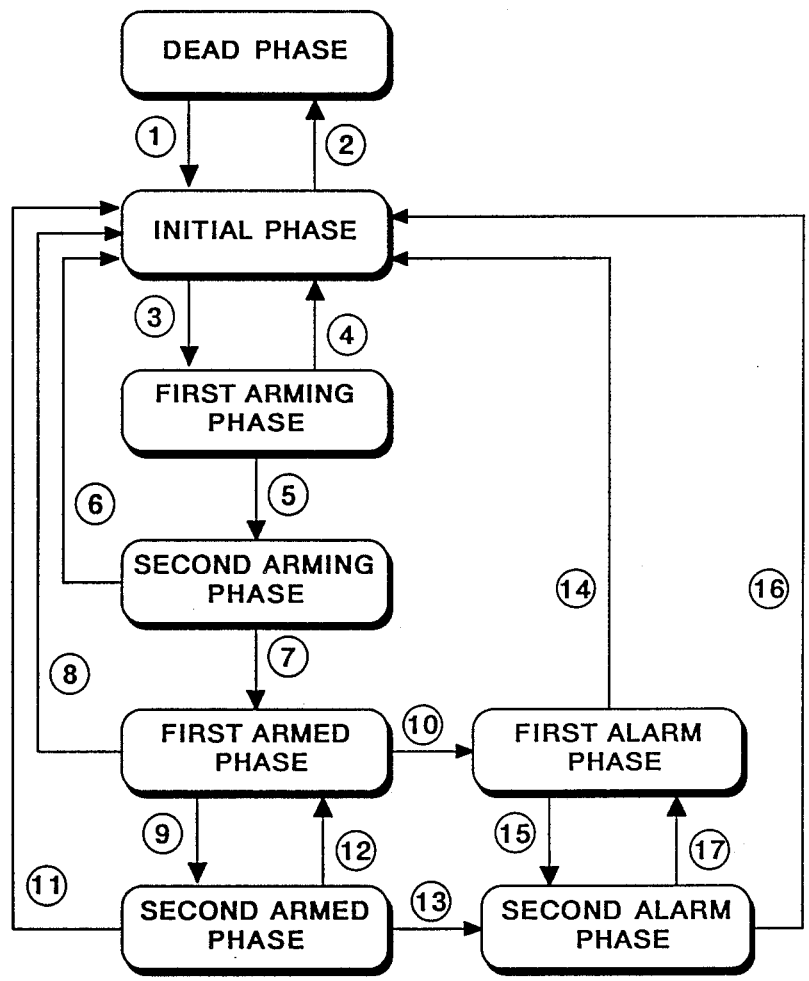

Reference will now be had to FIGS. 6A through 6C to describe the vehicle status detection sequence for actuating the theft deterrent system. As shown in FIG. 6A, the theft deterrent system has eight phases, namely a "dead" phase, an initial phase, a first pre-arming phase, a second pre-arming phase, a first armed phase, a second armed phase, a first alarm phase and a second alarm phase. FIG. 6A also shows how transitions are made between phases. FIG. 6B is a table illustrating the forms of outputs to alarm means in each phase as well as the conditions for a transition to each phase. FIG. 6C is a table showing the conditions that must prevail for the system to be placed in a certain phase. In FIG. 6A, arrows assigned numbers such as (1) indicate the destinations of the transitions shown in FIG. 6B. The "Transition Conditions" in the table of FIG. 6 represent the conditions that prevail in order for a transition to be made from a certain phase to a phase indicated by the "Transition Destination". The "Sustaining Conditions" in the table of FIG. 6C are those conditions that must prevail for a certain phase to remain in effect.

Figure 8:
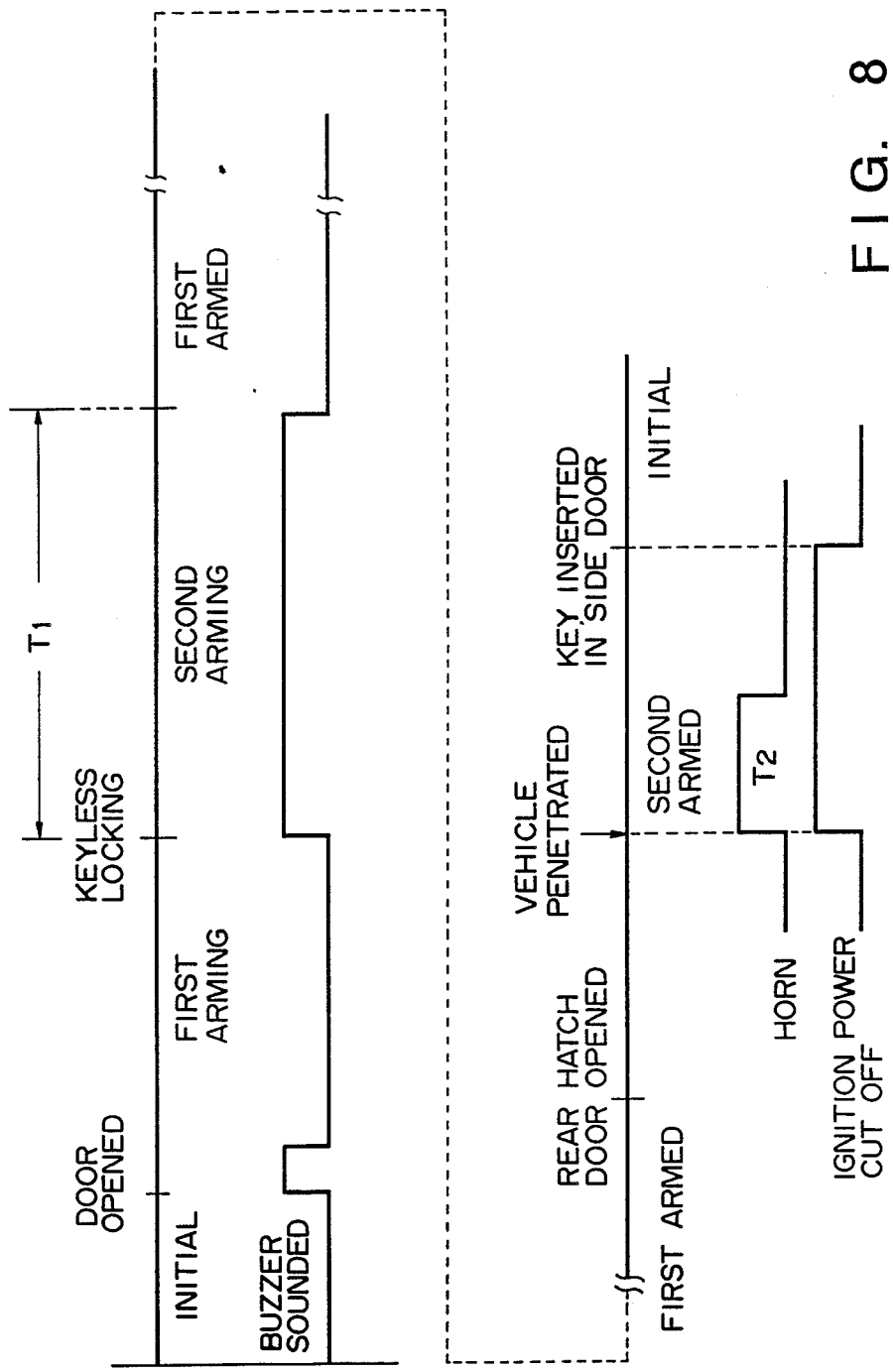
FIG. 8 is a view for describing the transition from one phase to another in the theft deterrent system.

Each of the phases will now be described with reference to FIGS. 6A and 8.

The "dead phase" is that which prevails when the driver drives the automobile and does not require actuation of the theft deterrent system. The "initial phase" is one representing a starting point from which the theft deterrent system is about to be placed in the armed phase. The driver has an opportunity to place the theft deterrent system in operation generally when the engine key is removed from the key assembly 2 [(1) in FIG. 6A]. When one side is then opened with the other side doors closed, a transition is made from the initial phase to the first pre-arming phase [(3) in FIG. 6A]. When keyless locking is performed in the first pre-arming phase, a transition is made to the second pre-arming phase [(5) in FIG. 6A]. The second pre-arming phase lasts for the time period T1, during which the buzzer 10 sounds to inform the driver that a transition is being made to the first armed phase. Upon elapse of the time period T1, the transition to the first armed phase is effected without any further operation by the driver [(7) in FIG. 6A]. If the vehicle is penetrated in the first armed phase [(10) in FIG. 6A], a transition is made to the first alarm phase, in which a warning alarm is actuated. If the driver opens the rear hatch door 4 using a key in the first armed phase [(9) in FIG. 6A], a transition is made to the second armed phase. If the vehicle is penetrated while the second armed phase is in effect [(13) in FIG. 6A], a transition is made to the second alarm phase and a warning alarm is issued. Though there will be no alarm in response to an output signal DETECTED from the moving object sensor 31 or the signal RH-O/C indicating that the rear hatch door is open, the other sensors will respond to penetration of the vehicle. This allows the driver to devote himself to loading or unloading the vehicle without fear of theft, as has already been described in connection with FIG. 2C.

Each of the foregoing phases will be briefly described with reference to FIGS. 6B and 6C.

The dead phase is maintained when at least the ignition switch 2a or engine key switch 2b is on, namely as long as the following condition holds:

IG-KEY+EG-KEY="1"

In accordance with FIG. 6B, a transition is made from the dead phase to the initial phase in response to two off signals (IG-KEY*·EG-KEY*·) indicating that the ignition switch 2a and engine key switch 2b are off, and the signal ALL-CLOSED (the output of the inverter 54 in FIG. 4) indicating that all of the opening and closing parts are closed. Here the symbol "*" indicates negative logic. In accordance with FIG. 6C, the initial phase is sustained when the following is logical "1":

IG-KEY*·EG-KEY*·ALL-CLOSED.

A transition from the initial phase to the dead phase takes place when the following condition holds:

INITIAL PHASE<--DEAD
PHASE=IG-KEY+EG-KEY

The transition from the initial phase to the first pre-arming phase takes place when any one of the opening and closing parts is opened. That is, this occurs when the signal ANYONE-OPN (the output of OR gate 53 in FIG. 4) is logical "1". In order to draw one's attention to the fact that the first pre-arming phase is in effect, the buzzer 10 sounds for a short time in this phase. In general, the first pre-arming phase corresponds to a case where the driver opens the door on the driver's side in order to exit from the vehicle.

The transition from the first pre-arming phase to the second pre-arming phase is preformed when the signal K-L-LK is produced, as shown in FIG. 6B. As shown in FIG. 4, the signal K-L-LCK is produced when all opening and closing parts other than the left and right side doors are closed (GP1D-OPN=1) and either the left or right side door has been closed upon pressing the lock button on this door, i.e. without use of the key.

Figure 7A:
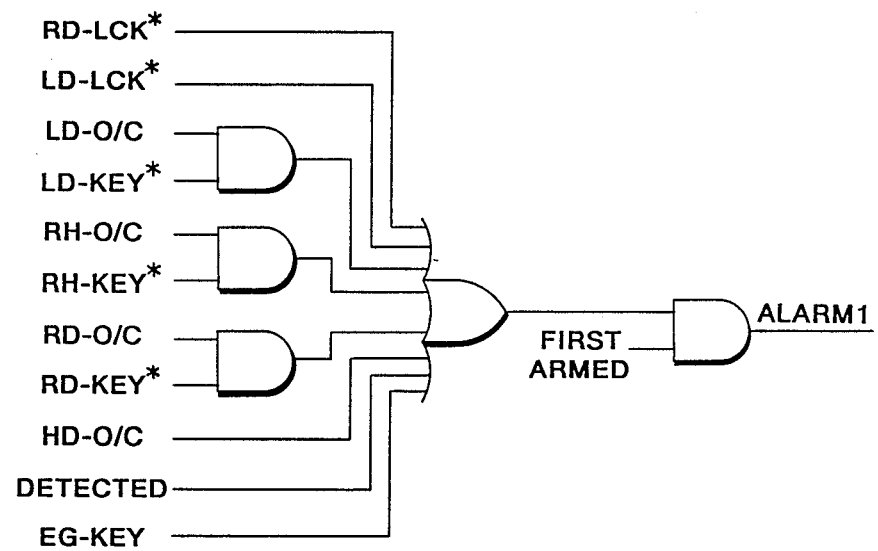
FIGS. 7A and 7B are views illustrating signals which form the conditions for triggering alarm actuation in the first and second armed phases.
Figure 7B:
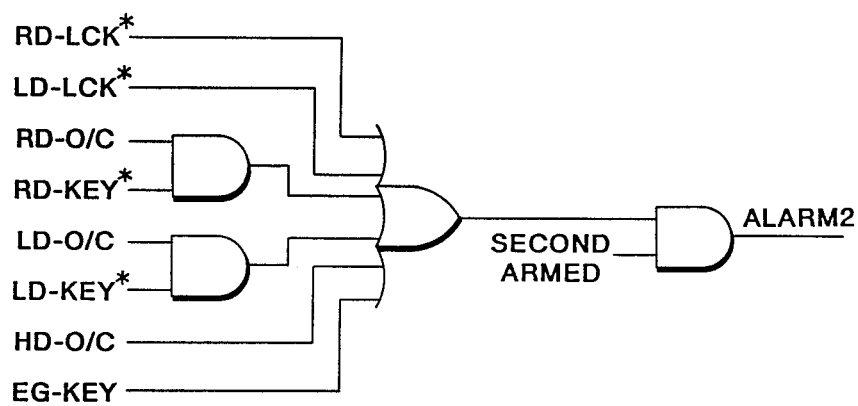

The transition from the second pre-arming phase to the first armed phase takes place upon passage of the time period T1 following the transition to the second pre-arming phase. The first armed phase is a phase in which all sensors are in a state ready to deter theft. FIG. 7A illustrates an example in which an alarm is triggered in the first armed phase. This example corresponds to the state shown in FIG. 2B. While FIG. 7A illustrates the signals which form the conditions for triggering alarm actuation in the first armed phase, FIG. 7B illustrates the signals which form the conditions for triggering alarm actuation in the second armed phase. As there shown, a second actuation AND gate actuates the alarm (ALARM2) in the second armed phase (indicated by SECOND ARMED input) in response to further signals (from RD-LCK, LD-LCK, RD-O/C etc. to the ALARM2 AND gate) indicative that there has been an opening or closing of one of the parts in those second group of parts which open and close other than the opening or closing part which had been opened at the time of the first to second armed phase transition. Thus the alarm is triggered when an engine hood is opened (HD-O/C=1)during the second armed phase. In the preferred embodiment described with respect to FIG. 7, the engine hood and rear hatch door are grouped into the second group of parts of the vehicle. Opening the rear hatch door by the driver is a trigger which placed the system in the second phase.

A transition from the first armed phase to the initial phase in FIG. 6B takes place when the driver returns to the vehicle, which is in the armed phase, and inserts the key into either cylinder 16 or 16' of side door 3 or 3' (GP1D-KEY=1), or when the key is inserted into the cylinder of the ignition assembly 2 and the ignition is turned on (IG-ON=1). These operations are necessary into order to cancel the armed phase. The conditions for shifting from the second armed phase to the initial phase are the same as those for shifting from the first armed phase to the initial phase.

A transition from the first alarm phase to the initial phase occurs when the driver cancels the guarding of the vehicle in a state where an alarm has been activated. The condition for making this transition is to open either side door (GP1D-OPN) or open the rear hatch door 4 by using the key (GP2D-KEY·GP2D-OPN=1), etc. The condition for returning from the second armed phase to the first armed phase is to close the rear hatch door 4 (GP2-O/C=0).

A transition from the first alarm phase to the second alarm phase occurs when the first alarm phase continues for the time period T2. The second alarm phase deters theft of the vehicle and prevents the battery from running out of power. Specifically, the horn sounds for the time period $T_2$ in the first alarm phase. When this time period expires, a shift is made to the the second alarm phase, in which the only countermeasure maintained is that which makes it impossible to start the engine, with the sounding of the horn being terminated. This provides the aforementioned effects.

Theft deterrence control executed by the CPU 40 will now be described in accordance with FIGS. 9A through 9D.

First, the system is placed in the dead state (step S1) when at least the engine key switch 2b or ignition switch 2a is first turned on. Next, if all opening and closing parts are closed (ALL-CLOSED) at a step S2 with both of the switches 20, 21 in the off state (IG-KEY*·$_E$EG-KEY*), the initial phase is established. If at least one opening and closing part is found to be open at the step S2 (ALL-CLOSED=0), then the program proceeds to a step S3, at which the first pre-arming phase is established.

If, in the first pre-arming phase, only one of the side doors 3, 3' belonging to the first group is opened by releasing the lock button (GP1D-UNLK-OPN=1) at the step S3, the buzzer is sounded at a step S4. That is, in a case where a transition is made from the dead phase to the first pre-arming phase via the initial phase, it is assumed that the driver will leave the vehicle by exiting from the side door 3. The sounding of the buzzer 10 is to inform the driver and passengers of the transition to arming. Next, if the engine key switch 2b or ignition switch 2a is found to be in the off state at a step S5, it is confirmed at a step S6 whether only the side door 3 or 3' is open and whether all other opening and closing parts are closed and either locked or unlocked (RH-O/C*·RD-O/C*·GP1D-OPN=1). If keyless locking (K-L-LCK=1) is performed at a step S7 with regard to the open side door 3 or 3', the program proceeds to a step S8, at which the second pre-arming phase is established.

In the second pre-arming phase, the timer T1 is actuated at the step S8, and actuation of the security lamp 9 is started at a step S9. If, during the period of time T1 set by the timer T1, a key is used in any one of the ignition key switch 2a, engine key switch 2b, the two side doors 3, 3' and the rear hatch door 4 at a step S10 (ANYONE-KEY=1), or any opening and closing part is open at a step S11 (ANYONE-OPN=1), the security lamp 9 is extinguished at a step S12 and the initial phase is restored. In other words, a transition to the first armed phase is inhibited by the driver's opening a door or the like within the time period T1 of the second pre-arming phase.

Conversely, if a key is not used in any door and all of the opening and closing parts are closed at the steps S10 through S13 (ANYONE*·ALL-CLOSED=1), then, upon expiration of the set time $T_1$, the buzzer 10 is sounded at a step S14 and the ultrasonic transmitter 30 and receiver 31 are actuated at a step S15 to sense a moving body, after which the first armed phase is established. In this phase, the securing lamp 9 is flashed at a step S16 and it is determined at a step S17 whether an alarm has been triggered (FIG. 7A) at a step S17.

Figure 9A:
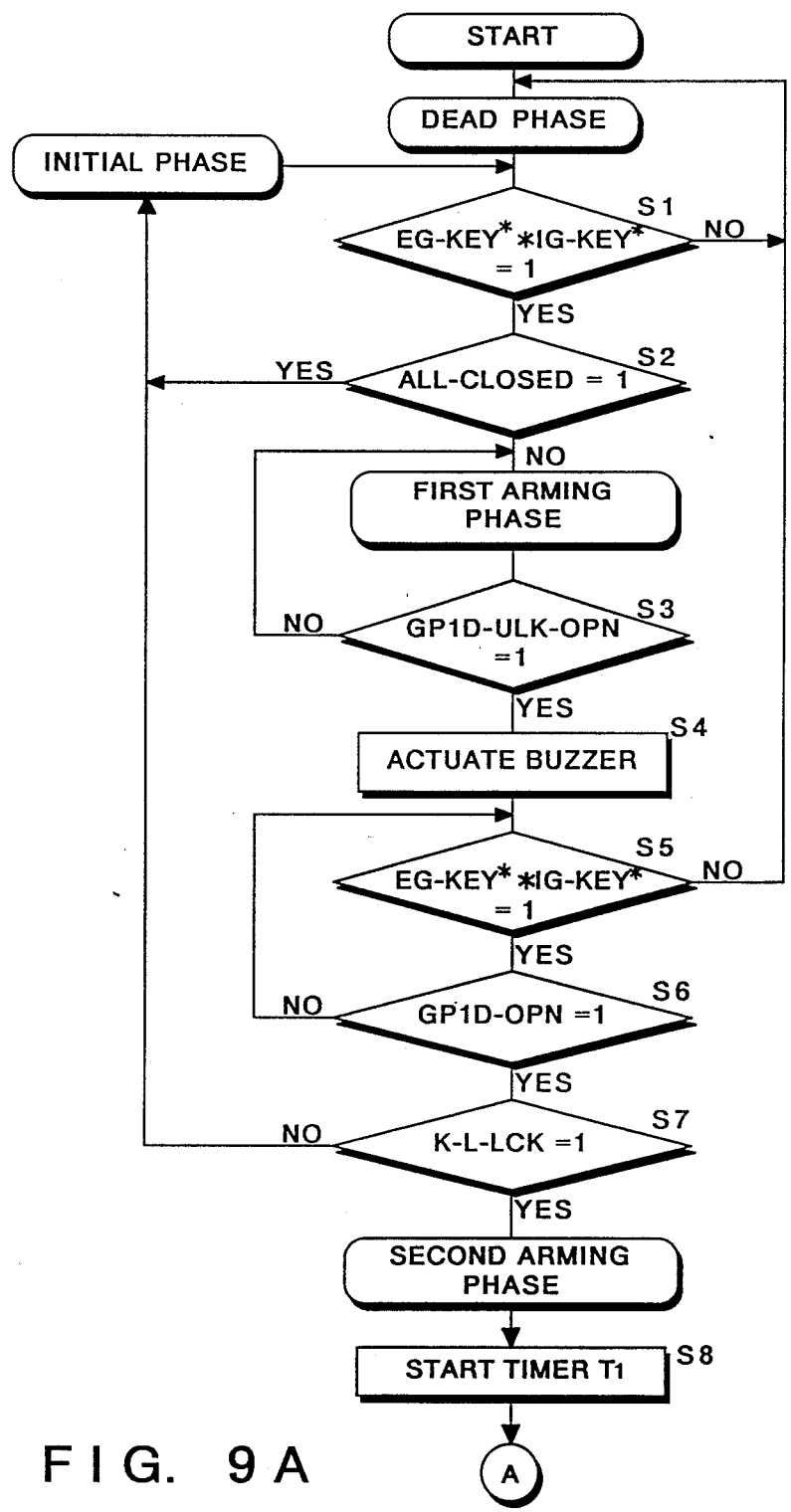
FIGS. 9A through 9D are flowcharts for describing control of the theft deterrent system.
Figure 9B:
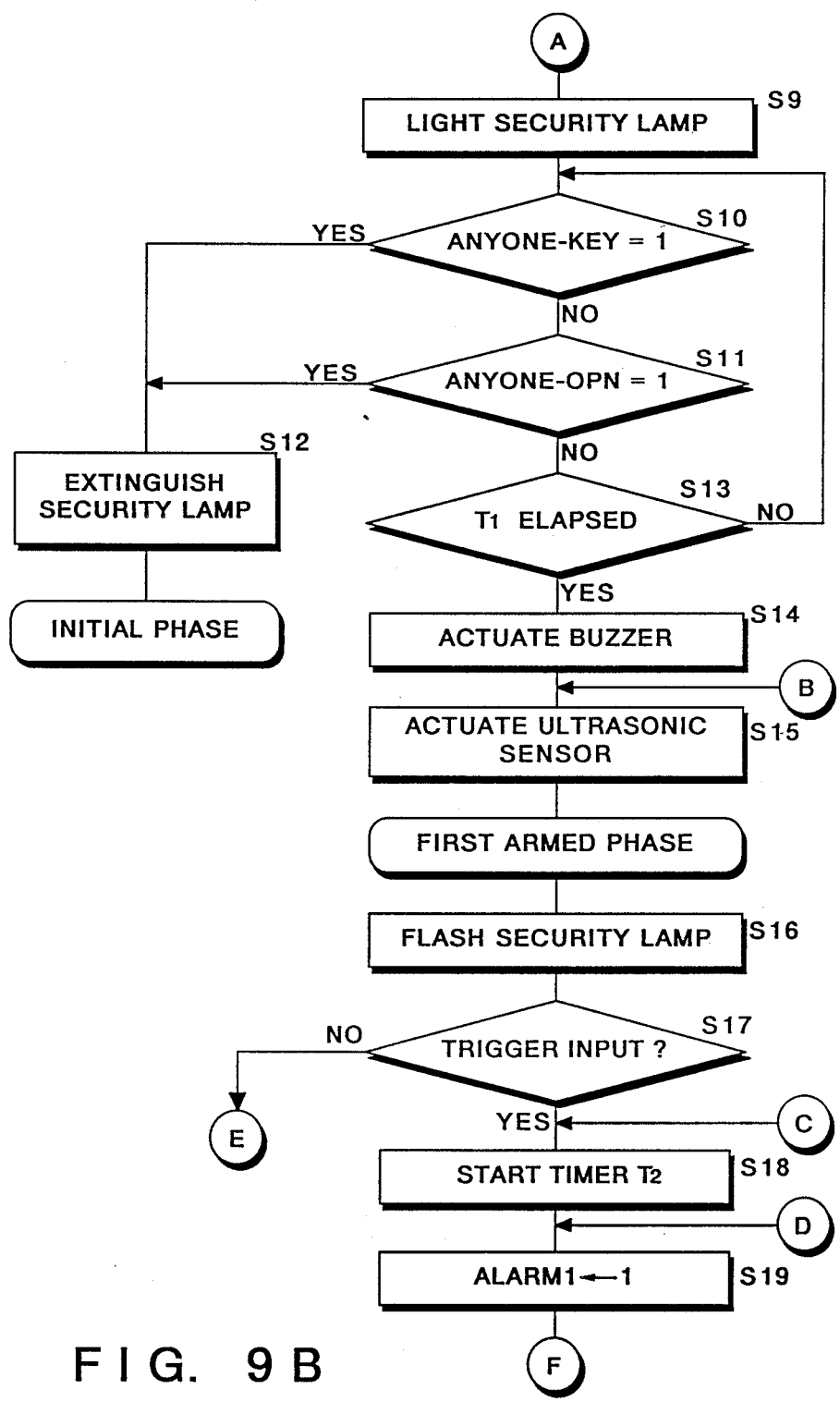
Figure 9C:
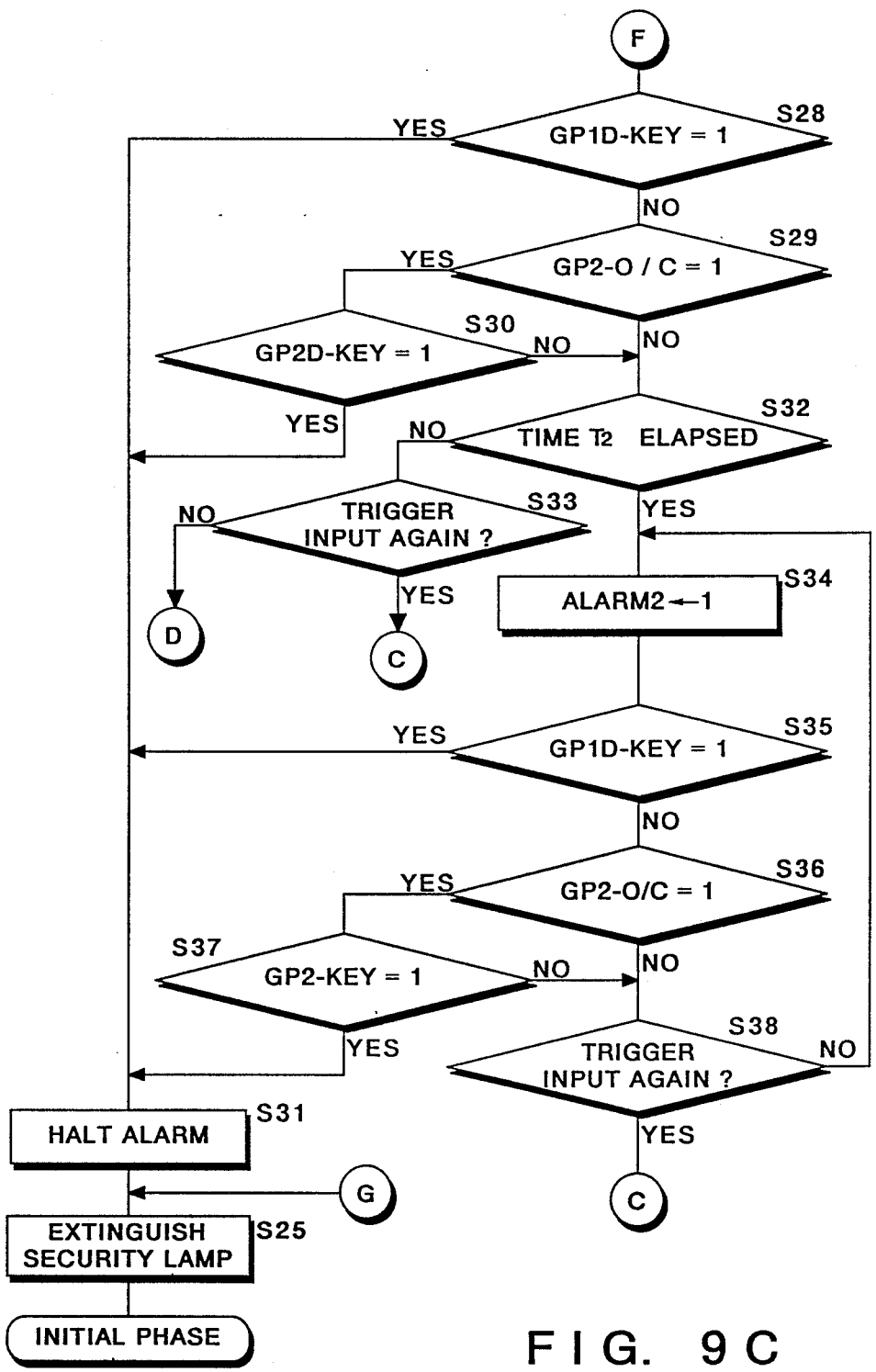
Figure 9D:
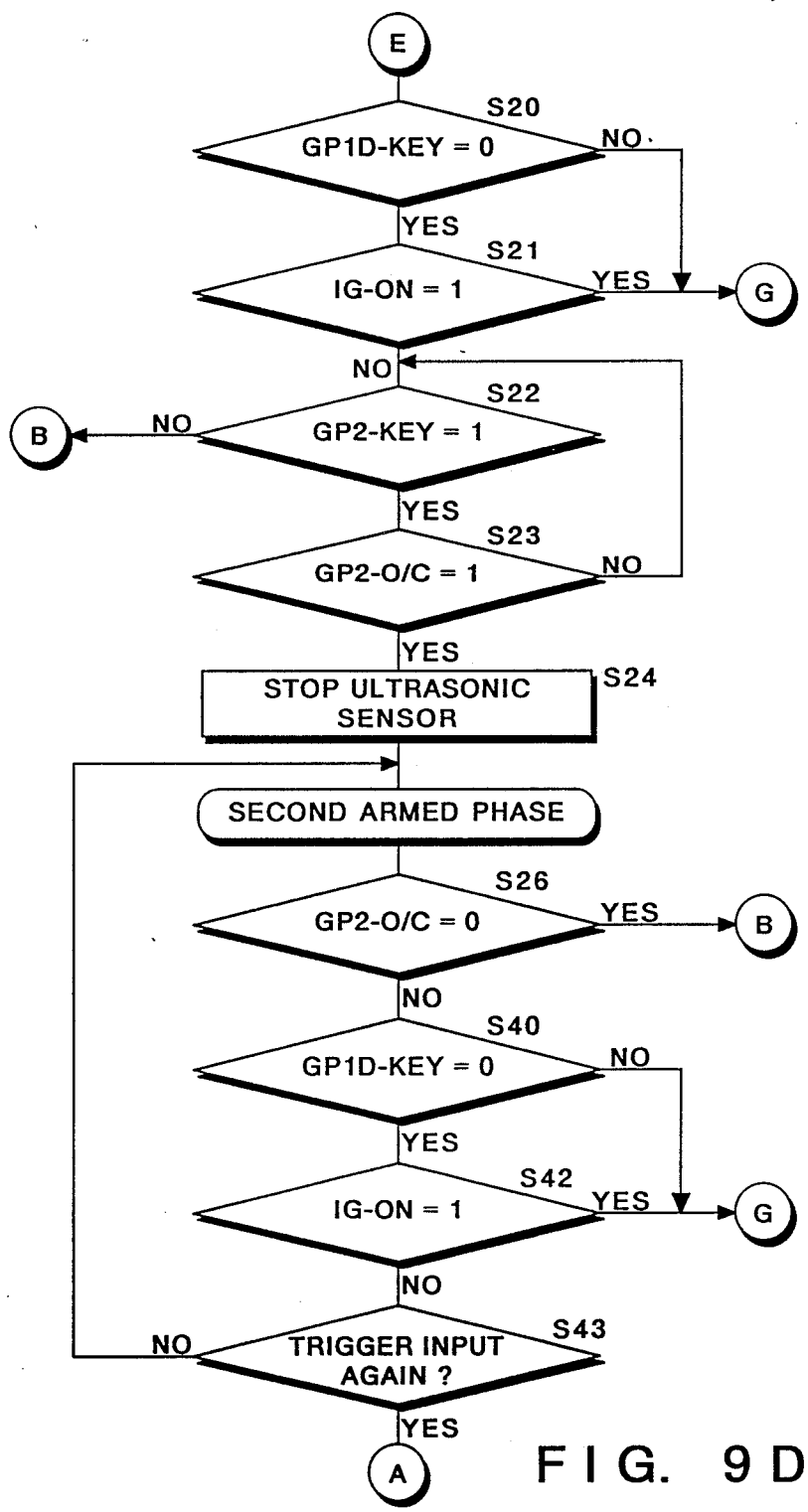

What occurs when an alarm trigger signal input is found to be absent at the step S17 will now be described. In this case the program proceeds to a step S20 (FIG. 9D). An alarm actuating trigger is monitored through steps S20, S21, S22, S15, S16, S17 and S20 in the order mentioned. Specifically, when it is found at the steps S20 through S22 that a key has not been inserted into any of the doors of the first group (GP1D-KEY=0), that the engine key has not been turned from "ON" to "START (IG-ON=0) and, moreover, that a key has not been inserted into the rear hatch door 4 of the second group (GP2-KEY=0), the first armed phase must be maintained.

The case in which a transition is made to the initial phase while the first armed phase is in effect will now be described. The transition to this phase generally corresponds to a situation in which the driver returns to the automobile 1 and opens a side door in the first group without an alarm having been issued while the driver was absent. If a YES answer (IG-ON=1) is received at the step S21, this corresponds to a situation in which keyless locking is performed from within the automobile to establish the first armed phase, followed by starting of the engine.

As for the transition from the first armed phase to the second armed phase, this corresponds to a situation in which the driver loads and unloads the automobile 1 through the rear hatch door 4, which is the opening and closing part belonging to the second group, when the first armed phase is in effect. Specifically, in the first armed phase, the opening of the rear hatch door is detected at a step S23. If it is found at steps S22, S23 that a key has been inserted into the rear hatch door 4 and that the rear hatch door 4 has been opened (GP2-KEY•GP2-O/C), operation of the ultrasonic sensors 30, 31 is terminated at a step S24 and the program proceeds to a step S26. The second armed phase is established by the loop consisting of steps S26, S40, S42, S43. When the loading or unloading operation ends and it is determined at the step S26 that the rear hatch door 4 has been closed, the program proceeds to the step S15 and the vehicle is returned to the first armed phase. It should be noted that steps S40, S42 are for returning from the second alarm phase to the initial phase and the contents of these steps are similar to the contents of steps S20 and S21.

What occurs when an alarm trigger signal input is found to be present at the step S17 will now be described.

RD-LCK*

+ LD-LCK*

+ LD-KEY*•LD-O/C

+ RD-KEY*•RD-O/C

+ RH-KEY*•RH-O/C

+ HD-O/C

+ EG-KEY

+ DETECTED

When there is an input of this kind, the timer T2 is set at a step S18 and an alarm is actuated at a step S19. The type of alarm actuated in the first alarm phase is as shown in FIG. 6B. The first alarm phase is maintained as long as the condition

GP1D-KEY*•GP2-O/C is found to hold in steps S28 through S30, namely as long as the driver does not insert a key in a side door of the first group or open the rear hatch door 4 of the second group by using the key.

If, during the period of time the first alarm phase is in effect, the driver returns to the vehicle and inserts the key into a side door (YES at the step S28) or opens the rear hatch door 4 by using the key (YES at the step S30), the alarm is halted at a step S31 and the initial phase is restored.

When the first alarm phase continues for the time period T2, the program proceeds from the step S32 to a step S34 and the transition is made to the second alarm phase. In this phase, the only action taken is to render the automobile unstartable for the reason set forth earlier. Steps S35 through S38 indicate the procedure for returning from the second alarm phase to the initial phase and the contents of these steps are the same as the contents of the steps S28 through S30.

What occurs when there is an alarm trigger signal input in the second alarm phase will now be described.

The condition for this trigger is as follows:

RD-LCK*

+ LD-LCK*

+ LD-KEY*•LD-O/C

+ RD-KEY*•RD-O/C

+ HD-O/C

+ EG-KEY

In other words, since the rear hatch door is already open in the second armed phase, an alarm actuating trigger produced in response to opening this door is unnecessary. In addition, since the sound waves from the ultrasonic transmitter 30 have little directionality and the actions of the driver (e.g. loading or unloading the vehicle) may therefore be erroneously detected, the signal DETECTED is excluded from the triggering conditions.

Thus, in the theft deterrent system of the illustrated embodiment described above, when the driver and passengers lock the opening and closing parts (side doors 3, 3' and hood 5) in the first group in the closed state and leave the vehicle 1, the first armed phase, which includes the operation of the ultrasonic sensor 31, will be established if one side door in the first group is closed by the keyless locking operation, as described earlier. If the rear hatch door 4 belonging to the second group is opened by using a key in this phase, the ultrasonic sensor 31 is disabled but the transition is made to the second armed phase, so that at least the other theft deterrent components remain active. In other words, though the ultrasonic sensor 31 is disabled in the second armed phase, an alarm will be actuated if a would-be thief attempts to force open parts other than the rear hatch door 4, such as the side doors or hood, when a driver or passenger is absent. Also, if a would-be thief penetrates the interior of the automobile through the open rear hatch door 4 and attempts to start the engine without using a key, at least the horn 6, the flasher lamps 8 and the cut-off switch 7 will be actuated at the moment the ignition switch 2a is turned on. Thus, the engine is made unstartable and a warning alarm is issued to the surroundings to indicate that the interior of the vehicle has been penetrated.

If a would-be thief forcibly removes the key cylinder from the rear hatch door 4 and manipulates the same to send the key switch signal RH-KEY to the "1" level, the second armed phase will still be in effect and, hence, the automobile 1 will be protected against theft.

If the driver or a passenger himself closes the rear hatch door 4 in the second armed phase, the first armed phase is restored automatically. Therefore, it is unnecessary to perform the keyless locking operation again in order to establish the first armed phase.

Though the rear hatch door of a hatchback-type vehicle is selected as the opening and closing part belonging to the second group in the foregoing embodiment, it is permissible, as one example of a modification, to select a trunk lid as this opening and closing part. Other modifications are also possible. For example, one side door can be assigned to the first group and the other side door to the second group. In case of a four-door vehicle, the front doors can be assigned to the first group and the rear doors to the second group. The engine hood can be assigned to the second group if desired.

Furthermore, in the foregoing embodiment, the removal of the engine key is one condition for placing the theft deterrent system in the initial phase. Instead of this condition, however, it is possible to adopt an arrangement in which the initial phase is established when the vehicle velocity drops below a fixed velocity.

Though the ultrasonic sensors 30, 31 are used as the sensors for sensing a moving object in the above-described embodiment, light or radio waves can be adopted as means for sensing a moving object. By improving the directionality of the ultrasonic waves from the transmitter 30 or using highly directional light, only the region immediately surrounding the driver's seat can be made a moving object detection zone. If this is done, it will no longer be necessary to exclude the moving object detection signal (DETECTED) from the alarm actuating triggers in the second armed phase.

In the foregoing embodiment, the condition for establishing the armed phase is keyless locking. However, other expedients may be used. For example, a command to make the transition to the armed phase can be issued via an optical, sonic or electromagnetic remote controller carried by the driver.

What is claimed is:

1. A theft deterent system, comprising:
   a vehicle having a plurality of opening and closing parts attached thereto, said plurality of opening and closing parts being able to be locked and unlocked, and being divided into a first group of one or more opening and closing parts and a second group of one or more opening and closing parts;
   alarm means for outputting an alarm exteriorly of the vehicle;
   open/closed state sensing means for sensing individual open and closed states of each of said plurality of opening and closed states of each of said opening and closing parts and outputting signals indicative of the states sensed,
   said open/closed state sensing means including detecting means coupled to some of said opening and closing parts for detecting that at least one of the opening and closing parts in the second group has been unlocked from the exterior of the vehicle by the driver;
   means for sensing that an ignition signal for starting an engine of the vehicle has been generated;
   first setting means for setting the vehicle to a first armed phase in response to an operation performed by the driver;
   first actuating means for actuating said alarm means in response to at least one signal sensed during the first armed phase, from among a group of possible signals including (a) said ignition signal and (b) the signals indicative of the open states of said plurality of opening and closing parts;
   second setting means for setting the vehicle from the first armed phase to a second armed phase in response to an unlocking operation detected by said detecting means during the first armed phase; and
   second actuating means for actuating said alarm means in the second armed phase in response to at least one signal, sensed during the second armed phase, from among said group of possible signals, including (a) said ignition signal and (b) the signals indicative of the open states of said opening and closing parts belonging solely to the first group.

2. The system according to claim 1, further comprising
   said open/closed state sensing means including means for detecting a locking and closing operation of the unlocked and opened parts in the second group during the second armed phase, and
   means for reinstating the vehicle from the second armed phase to the first armed phase in response to the detection of the detecting means.

3. The system according to claim 1, wherein said opening and closing parts in the first group are door bodies being able to be opened and unlocked or closed and locked from the exterior or interior of the vehicle by the driver, and said opening and closing parts in the second group are door bodies being able to be opened and unlocked or closed and locked from the exterior by the driver.

4. The system according to claim 3, wherein one opening and closing part in the first group is a side door of the vehicle.

5. The system according to claim 6, wherein said side door is a door to a driver's seat.

6. The system according to claim 4, wherein said side door is a front door on the passenger's seat side.

7. The system according to claim 3, wherein one opening and closing part in the second group is a back door or rear door hatch of the vehicle.

8. The system according to claim 7, wherein said back door leads to a driver's seat of the vehicle.

9. The system according to claim 3, wherein one opening and closing part in the second group is an engine hood of the vehicle.

10. The system according to claim 3, wherein one opening and closing part in the second group is a trunk lid of a vehicle.

11. The system according to claim 1, wherein each opening and closing part of the first group has lock operating means for locking, by the operation thereof by the driver, said each opening and closing part; and wherein
   said first setting means includes:
   means responsive to said detecting means for outputting a key signal upon a detection, with regard to each of said plurality of opening and closing parts, that a key for opening said opening and closing parts has been used;
   means for outputting a lock operation signal upon detecting operation of said lock operating means; and logic means for detecting simultaneously, that a key signal regarding any one of the opening and closing parts in the first group is false, that the lock operation signal is true and that a signal indicating the open state of an opening and closing part for which the key signal represents non-use of the key is true.

12. The system according to claim 1, wherein there is provided means responsive to said detecting means for outputting a key signal upon a detection that a key has been used to open and unlock at least one of the opening and closing parts in the second group and
    said second setting means includes means connected to said outputting means for changing the phase of the vehicle from the first armed phase to the second armed phase when said signal is true.

13. The system according to claim 1, further comprising:
    engine starter means for electrically starting rotation of the engine;
    means for supplying said starter means with electric power; and
    electric power cut-off means for cutting off the supply of electric power;
    said first and second actuating means including means for activating said power cut-off means.

14. The system according to claim 1, further comprising timer means for monitoring elapsed time and outputting a time-up signal when a set period of time has elapsed;
    said first and second actuating means including means for setting said timer means, at the same time said alarm means is actuated, to a time period over which said alarm means is to continue issuing an alarm.

15. The system according to claim 1, wherein there is provided:
    engine starting means for electrically starting rotation of the engine;
    means for supplying said starter means with electric power;
    electric power cut-off means for cutting off the supply of electric power;
    and wherein there is provided means responsive to said detecting means for outputting a key signal upon a detection, with regard to each opening and closing parts, that a key has been used to open said opening and closing part;
    said first and second actuating means including means for activating said electric power cut-off means upon detecting that the key signal regarding the opening and closing part in the first group is true.

16. The system according to claim 1, further comprising:
    sensor means provided in a passenger compartment of the vehicle for outputting a moving object signal upon sensing movement of an object within the passenger compartment;
    said first actuating means actuating said alarm means in the first armed phase in response to at least one signal from among the said group of possible signals including (a) said ignition signal and (b) the signals indicative of the open states of said opening and closing parts and (c) said moving object signal;
    said second actuating means actuating said alarm means in the second armed phase in response to at least one signal from among said group of possible signals including (a) said ignition signal and (b) the signals indicative of the open states of said opening and closing parts solely in the first group and (c) said moving object signal.

17. The system according to claim 1, further comprising:
    sensor means provided in a passenger compartment of the vehicle for outputting a moving-object signal upon sensing movement of an object within the passenger compartment; and
    means for rendering said second actuating means non-responsive to the moving-object signal in the second armed phase.

18. The system according to claim 17, wherein said sensor means includes ultrasonic oscillating means and receiving means for receiving ultrasonic waves from said ultrasonic oscillating means.

19. The system according to claim 1, wherein said second actuating means actuates said alarm means in the second armed phase in response to further signals indicative that there has been an opening and closing of one of said parts in the second group other than the opening and closing part which had been opened at the time of the first to second armed phase transition.

* * * * *

UNITED STATES PATENT AND TRADEMARK OFFICE
CERTIFICATE OF CORRECTION

PATENT NO. : 4,963,856
DATED : October 16, 1990
INVENTOR(S) : Kazuo Yukitomo It is certified that error appears in the above-identified patent and that said Letters Patent is hereby corrected as shown below:

column 10, line 1:
after "side" insert --door--;

column 11, line 42:
"into" should be --in--;

column 13, line 33:
after "described." the next paragraph line should be --The condition for this trigger is as follows:-- column 14, lines 57 & 58:
"surroudings" should be --surroundings--;

column 16, claim 5, line 32:
"claim 6" should be --claim 4--.

Signed and Sealed this

Sixteenth Day of November, 1993

Attest:

BRUCE LEHMAN

*Attesting Officer*   *Commissioner of Patents and Trademarks*